US012798793B2

(12) United States Patent
Brady et al.

(10) Patent No.: US 12,798,793 B2
(45) Date of Patent: Nov. 17, 2026

(54) METHOD AND APPARATUS FOR CONDUCTING HEALTH MONITORING DURING GROUND OPERATION

(71) Applicants: Airbus Operations GmbH, Hamburg (DE); Liebherr-Aerospace Lindenberg GmbH, Lindenberg (DE)

(72) Inventors: Michael Brady, Hamburg (DE); Andreas Fleddermann, Hamburg (DE); Jan Arend Van Bruggen, Hamburg (DE); Elko Van Balen, Lindenberg (DE); Tobias Hartmann, Lindenberg (DE); Christian Kohlöffel, Lindenberg (DE)

(73) Assignees: Airbus Operations GmbH, Hamburg (DE); Liebherr-Aerospace Lindenberg GmbH, Lindenberg (DE)

( * ) Notice: Subject to any disclaimer, the term of this patent is extended or adjusted under 35 U.S.C. 154(b) by 172 days.

(21) Appl. No.: 18/574,433

(22) PCT Filed: Jun. 27, 2022

(86) PCT No.: PCT/EP2022/067484
§ 371 (c)(1),
(2) Date: Dec. 27, 2023

(87) PCT Pub. No.: WO2023/274913
PCT Pub. Date: Jan. 5, 2023

(65) Prior Publication Data

US 2024/0336374 A1 Oct. 10, 2024

(30) Foreign Application Priority Data

Jun. 29, 2021 (EP) .................................... 21182572

(51) Int. Cl.
*B64F 5/60* (2017.01)
*B64C 13/38* (2006.01)
*B64D 45/00* (2006.01)

(52) U.S. Cl.
CPC ................ *B64F 5/60* (2017.01); *B64C 13/38* (2013.01); *B64D 2045/0085* (2013.01)

(58) Field of Classification Search
CPC .... B64F 5/60; B64C 13/38; B64D 2045/0085
See application file for complete search history.

(56) References Cited

U.S. PATENT DOCUMENTS 6,824,099 B1 11/2004 Jones
2016/0176539 A1 6/2016 Van Bruggen et al.
(Continued)

FOREIGN PATENT DOCUMENTS

EP 3037346 A1 * 6/2016 ................ B64F 5/60
EP 3037347 A1 6/2016

OTHER PUBLICATIONS

International Search Report and Written Opinion for corresponding International Patent Application No. PCT/EP2022/067484 dated Sep. 19, 2022.

*Primary Examiner* — Hitesh Patel
*Assistant Examiner* — Joshua Jeffrey Penko
(74) *Attorney, Agent, or Firm* — Greer, Burns & Crain, Ltd.

(57) ABSTRACT

A health monitoring method for checking a functionality of a flight control surface driving apparatus using a load sensor for sensing a load imposed on a control surface drive device by: comparing a load sensor output signal of the load sensor with a first while operating the control surface drive device to move the at least one control surface to a predetermined extended position; or, comparing a load sensor output signal of the load sensor with a second threshold while operating the control surface drive device to move the control surface
(Continued)

from an extended position to a retracted position; or both. Also a flight control surface drive apparatus, a flight control system and an aircraft.

15 Claims, 3 Drawing Sheets

(56) References Cited

U.S. PATENT DOCUMENTS

2016/0176540 A1 6/2016 Fleddermann et al.
2020/0156766 A1* 5/2020 Tzabari ..................... B64C 9/02

* cited by examiner

METHOD AND APPARATUS FOR CONDUCTING HEALTH MONITORING DURING GROUND OPERATION

CROSS-REFERENCES TO RELATED APPLICATIONS

This application is a national phase of International Patent Application No. PCT/EP2022/067484, filed on Jun. 27, 2022, which claims the benefit of European Patent Application No. 21 182 572.4, filed on Jun. 29, 2021, the entire disclosures of which are incorporated herein by way of reference.

FIELD OF THE INVENTION

The invention relates to a health monitoring method for checking a functionality of a flight control surface driving apparatus comprising a control surface drive device for generating mechanical power for moving at least one control surface, and a transmission device for transmitting mechanical power from the control surface drive device to the at least one control surface. Further, the invention relates to a flight control surface driving apparatus comprising a control surface drive device for generating mechanical power for moving at least one control surface, and a transmission device for transmitting mechanical power from the control surface drive device to the at least one control surface. Further, the invention relates to a flight control system and an aircraft comprising such flight control surface driving apparatus.

BACKGROUND OF THE INVENTION

A conventional fixed-wing aircraft flight control system consists of flight control surfaces, the respective cockpit controls, connecting linkages, and the operating mechanisms to control an aircraft's direction or behaviour in flight.

Aircraft flight control surfaces are aerodynamic devices allowing a pilot to adjust and control the aircraft's flight attitude. For example, a high lift system of an aircraft includes flight control surfaces such as slats, flaps, and/or variable-sweep wings.

Conventionally, control surface drive apparatuses for driving movement of such control surfaces comprise a control surface drive device which generates the mechanical power for the movement, a transmission device for transmitting this mechanical power to the control surfaces, and a control device comprising a power control unit.

For example, typical high lift systems of commercial and military aircraft are powered by a centralized PCU mounted in the fuselage with computerized control. Commonly, the PCU is connected to transmission device including a torque shaft system which provides the mechanical power to geared actuators at the flap or slat panel drive stations. Additionally, a braking device, especially a wing tip brake (WTP) in each wing, may be an integrated part of the transmission device.

The WTB is capable to arrest and hold the system in failure cases. First and second independent slat flap computers (SFCC) control and monitor the system. Common PCUs have first and second independent motors which are connected by a speed summing differential gear (DIFG). Each motor is provided with a power-off brake (POB) to arrest the motor in the commanded position. Depending on the aircraft power supply system and the availability requirements, the PCU can be purely hydraulically or electrically driven or includes each of an electric motor and a hydraulic motor (hybrid PCU). For the electric drive digitally controlled brushless DC motors are commonly used.

Motor control is usually established by a closed loop layout to maintain speed and torque command inputs. The control algorithms can be implemented in a controller (e.g. SFCC) which is provided with all required data to control the motors.

The electric motor is supplied by the aircraft electrical busbar. A motor control electronic (MCE) is interfacing with the SFCC and the aircraft electrical busbar.

The MCE converts the electric power as required for the brushless DC motor and provides motor control. It is also possible that the control algorithm is implemented in the MCE. In this case the SFCC provides corresponding drive states (e.g. via a data bus system).

In the default high-lift operating mode the WTBs are released and the PCU is providing the power to operate the high-lift system (HLS) with the commanded speed into any gated position.

As a result, the PCU is usually only operating for a very small time frame (starting and landing) of a flight.

Other common driving apparatuses for driving movement of at least one control surface may have first and second central linear actuators outputting a linear movement to the transmission device. The transmission device transmits this movement by a linearly movable element, e.g., of a push rod, a cable or the like to mechanical actuators of the control surface.

The invention aims to improve the driving of movement of aircraft flight control surfaces, especially of a high-lift device, in terms of long-time reliability, early detecting of wear and reduction of maintenance work.

SUMMARY OF THE INVENTION

The invention provides a health monitoring method, a flight control surface driving apparatus, a flight control system, an aircraft and a computer program in accordance with one or more embodiments described herein.

Advantageous embodiments are also described.

The invention provides according to one aspect thereof a health monitoring method for checking a functionality of a flight control surface driving apparatus. The flight control surface driving apparatus to be monitored comprises a control surface drive device for generating mechanical power for moving at least one control surface, a transmission device for transmitting mechanical power from the control surface drive device to the at least one control surface, at least one load sensor for sensing a load imposed on the control surface drive device, and a control device configured to receive a load sensor output signal from the at least one load sensor and to control the control surface drive device in response to the load sensor output signal. The health monitoring method comprises automatically checking proper functionality of the at least one load sensor and/or the transmission device in at least one on-ground condition by at least one of a) comparing at least one load sensor output signal of the at least one load sensor with at least one first threshold while operating the control surface drive device to move the at least one control surface to a predetermined extended position, and b) comparing at least one load sensor output signal of the at least one load sensor with at least one second threshold while operating the control surface drive device to move the at least one control surface from an extended position to a retracted position.

Preferably, the flight control surface driving apparatus is configured to drive primary flight control surfaces such as ailerons, rudders, etc. or is configured to drive secondary control surfaces such as high-lift devices.

Preferably, step a) comprises:

a1) performing the comparison and the operation of the control surface drive device to extend the at least one control surface as an automatically conducted routine operation before any take-off.

Preferably, step a) comprises:

a2) performing the comparison and the operation of the control surface drive device to extend the at least one control surface as an automatically conducted routine operation during taxi or when arriving a parking position after any landing.

Preferably, step a) comprises:

a3) evaluating whether the at least one load sensor output signal lies between a first lower and a first upper threshold.

Preferably, step a) comprises:

a4) obtaining an average value of load sensor output signals of the at least one load sensor over a time interval during the extending operation and comparing the average value with the at least one first threshold.

Preferably, the at least one load sensor for sensing a load imposed on the control surface drive device includes a first load sensor for sensing the load imposed on the control surface drive device and a second load sensor for sensing the load imposed on the control surface drive device.

Preferably, step a) comprises:

a5) obtaining a first load sensor output signal from the first load sensor and a second load sensor output signal from the second load sensor and comparing the first and the second load sensor output signals with the at least one first threshold.

Preferably, step a) comprises:

a6) obtaining a first load sensor output signal from the first load sensor and a second load sensor output signal from the second load sensor, obtaining an average value from the first and second load sensor output signals and comparing this average value with the at least one first threshold.

Preferably, step a) comprises:

a7) obtaining a first load sensor output signal from the first load sensor and a second load sensor output signal from the second load sensor while operating the control surface drive device to extend the at least one control surface and comparing a difference between the first and second load sensor output signals with at least one third threshold.

Preferably, step a) comprises:

a8) determining an operation speed for extending the at least one control surface and performing the comparison when the operation speed lies in a predetermined nominal operation speed range.

Preferably, step b) comprises:

b1) performing the comparison and the operation of the control surface drive device to retract the at least one control surface as an automatically conducted routine operation after landing.

Preferably, step b) comprises:

b2) performing the comparison and the operation of the control surface drive device to retract the at least one control surface during taxi or on arrival of a parking position each time after landing.

Preferably, step b) comprises:

b3) evaluating whether the at least one load sensor output signal lies between a second lower and a second upper threshold.

Preferably, step b) comprises:

b4) obtaining an average value of load sensor output signals of the at least one load sensor over a time interval during the retracting operation and comparing the average value with the at least one second threshold.

Preferably, step b) comprises:

b5) obtaining a first load sensor output signal from the first load sensor and a second load sensor output signal from the second load sensor and comparing the first and the second load sensor output signals with the at least one second threshold.

Preferably, step b) comprises:

b6) obtaining a first load sensor output signal from the first load sensor and a second load sensor output signal from the second load sensor, obtaining an average value from the first and second load sensor output signals and comparing this average value with the at least one second threshold.

Preferably, step b) comprises:

b7) obtaining a first load sensor output signal from the first load sensor and a second load sensor output signal from the second load sensor while operating the control surface drive device to retract the at least one control surface and comparing a difference between the first and second load sensor output signals with at least one third threshold.

Preferably, step b) comprises:

b8) determining an operation speed for retracting the at least one control surface and performing the comparison when the operation speed lies in a predetermined nominal operation speed range.

Preferably, both steps a) and b) are performed one after another-either first step b) and then step a) or first step a) and then step b). Preferably, the method further comprises c) evaluating whether an amount of a difference between at least one load sensor output signal of the at least one load sensor obtained in step a) during the extending operation and at least one load sensor output signal of the at least one load sensor obtained in step b) during the retracting operation exceeds a predetermined minimum.

Preferably, the method further comprises the step of:

obtaining at least one environmental parameter influencing the at least one load sensor output signal and compensating the load sensor output signal in response to the environmental parameter.

Preferably, the method further comprises the step of:

determining whether the at least one on-ground condition exists on basis of a relative air speed.

Preferably, the flight control surface driving apparatus to be monitored comprises at least one rotating element for transmitting mechanical power to the at least one control surface, wherein the at least one load sensor is at least one torque sensor for determining a torque on the rotating element. Especially, the rotating element is an output shaft of the control surface drive device. Preferably, the flight control surface driving apparatus comprises a first torque sensor unit (TSU) and a redundant second torque sensor unit (TSU) on each rotating output element of the control surface drive to sense the torque thereon.

Preferably, a failure message signal is issued when at least one of steps a) and b) lead to the result that the output of the at least on load sensor lies outside an expected range defined by the at least one threshold.

According to another aspect, the invention provides a flight control surface driving apparatus comprising:

a control surface drive device for generating mechanical power for moving at least one control surface, a transmission device for transmitting mechanical power from the control surface drive device to the at least one control surface, at least one load sensor for sensing a load imposed on the control surface drive device, and a control device configured to receive a load sensor output signal from the at least one load sensor and to control the control surface drive device in response to the load sensor output signal, the control device being configured to automatically check proper functionality of the load sensor and/or the transmission device in at least one on-ground condition by at least one of a) comparing at least one load sensor output signal of the at least one load sensor with at least one first threshold while operating the control surface drive device to move the at least one control surface to a predetermined extended position, b) comparing at least one load sensor output signal of the at least one load sensor with at least one second threshold while operating the control surface drive device to move the at least one control surface from an extended position to a retracted position.

Preferably, the flight control surface driving apparatus is suitable to drive primary flight control surfaces such as ailerons, rudders, etc. and/or secondary control surfaces such as high-lift devices.

Preferably, the control device is configured to automatically conduct the health monitoring method according to any of the above-mentioned embodiments.

Preferably, the control surface drive device comprises at least one rotating output shaft, and the at least one load sensor comprises at least one torque sensor for sensing a torque on the rotating output shaft.

Preferably, there is at least a first and a second load sensor for sensing torque on an output member of the control surface drive device or on an input member of the transmission device.

Preferably, there is at least a first and a second torque sensor for sensing torque on an input end of an input rotating shaft of the transmission device. Preferably, the first and second torque sensors determine the torque on an output of the control surface drive device connected to the input end.

According to another aspect, the invention provides a flight control system for an aircraft, comprising at least one flight control surface and at least one flight control surface driving apparatus according to any of the above-mentioned embodiments for driving the movement of the at least one flight control surface.

Preferably, the flight control system further comprises left-hand and right-hand series of slats and flaps of a high lift system as the at least one control surface.

Preferably, the flight control system further comprises an environmental parameter sensor for sensing at least one environmental parameter affecting the at least one load sensor output signal, wherein the control device is configured to compensate the effect on the at least one load sensor output signal in response to an output of the environmental parameter sensor.

Preferably, the flight control system further comprises an air speed sensing device for determining a relative air-speed wherein the control device is configured to conduct the check of proper functionality in response to an output of the air speed sensing device.

Preferably, the at least one load sensor for sensing a load imposed on the control surface drive device includes a first load sensor for sensing the load imposed on the control surface drive device and a second load sensor for sensing the load imposed on the control surface drive device.

Preferably, the flight control system further comprises the first load sensor and a first controller receiving a load sensor output signal of the first load sensor and controlling the movement of the at least one control surface in response to the load sensor output signal of the first load sensor.

Preferably, the flight control system further comprises the second load sensor and a second controller receiving a load sensor output signal of the second load sensor and controlling the movement of the at least one control surface in response to the load sensor output signal of the second load sensor.

Preferably, the flight control system further comprises at least one brake device for braking or blocking movement of the transmission device. Preferably, the brake device has at least one brake element imposing a braking force to an output element of the transmission device. Especially, the braking device is a wing tip brake to be disposed near to an wing tip of the aircraft to be equipped with a slat and/or flap drive system including the flight control surface drive apparatus for driving movements of slats and/or flaps.

Preferably, the control device is configured to compare the load sensor output signal of the at least one load sensor with a predetermined maximum load value and to trigger, when the load sensor output exceeds the predetermined maximum load value, a reverse movement and a subsequent load control sequence for controlling the load to achieve a lower load level.

According to another aspect, the invention provides an aircraft comprising the flight control surface driving apparatus according to any one of the above-mentioned embodiments and/or the flight control system according to any one of the above-mentioned embodiments. Especially, the aircraft has a high-lift system with slats and flaps which are driven by the flight control surface drive apparatus.

According to another aspect, the invention provides a computer program comprising instructions to cause the flight control system of any of the above-mentioned embodiments to execute the steps of the health monitoring method according to any of the above-mentioned embodiments.

Preferred embodiments of the invention propose an automatically performed enhanced torque sensor unit health monitoring. Preferred embodiments of the invention provide an automatically performed torque sensor monitoring during ground operation of an aircraft.

Preferred embodiments of the invention reduce efforts and costs. Preferred embodiments use an automatic detection system which leads to an economic operation. While embodiments of the invention are particularly suitable when used in connection with flight control surface driving apparatuses suitable for driving primary flight control surfaces or secondary flight control surfaces, embodiments of the invention are also applicable to other movable actuated surfaces in an aircraft such as cargo doors, landing gear doors, etc. Thus, a similar health monitoring method can be conducted in a cargo door drive or a landing gear door drive or any other drive for other movable aircraft surfaces.

BRIEF DESCRIPTION OF THE DRAWINGS

Preferred embodiments of the invention are explained below with reference to the drawings in which.

DETAILED DESCRIPTION OF THE PREFERRED EMBODIMENTS

Figure 1:
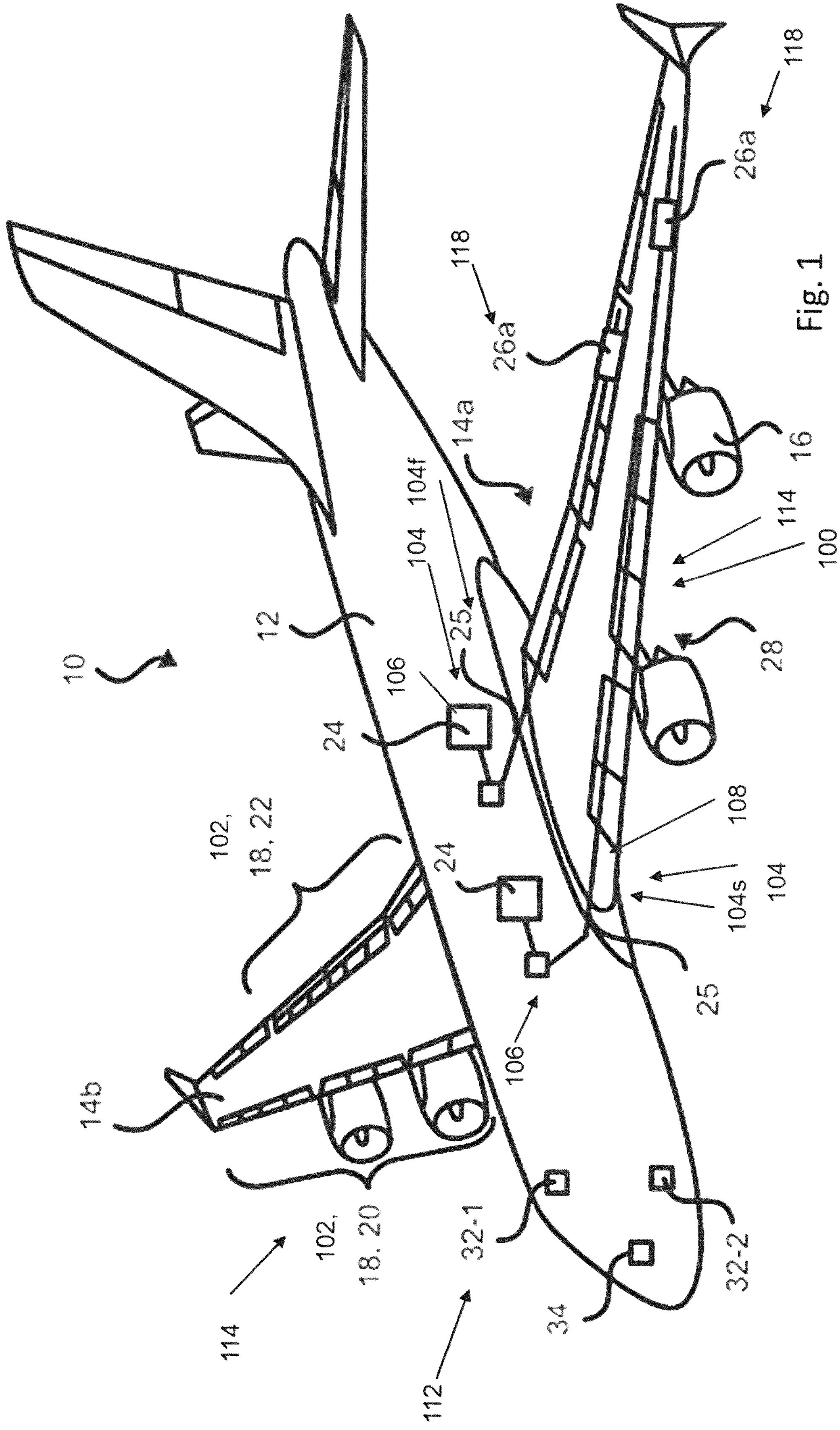
FIG. 1 depicts an embodiment of an aircraft.

Referring to FIG. 1, an aircraft 10 has a flight control system 100 including control surfaces 102 and a flight control surface driving apparatus 104. The flight control surface driving apparatus 104 comprises a control surface drive device 106 for generating mechanical power for the movement of at least one of the control surfaces 102, a transmission device 108 for transmitting mechanical power from the control surface drive device 106 to the at least one of the control surfaces 102, at least one load sensor 110 for sensing a load imposed on the control surface drive device 106, and a control device 112 configured to receive a load sensor output signal from the at least one load sensor 110 and to control the control surface drive device 106 in response to the load sensor output signal. In the embodiment shown, the flight control system 100 includes a high lift system 114 with high-lift devices 18 as control surfaces 102. Several flight control surface driving apparatuses 104, 104*s*, 104*f* are configured to drive associated groups of such high-lift devices 18. In the embodiment shown, the flight control surface driving apparatus 104 further includes a brake device 114 for braking or blocking movement of the transmission device 108.

As further shown in FIG. 1, the aircraft 10 has a fuselage 12. The aircraft 10 also has a pair of wings 14*a*, 14*b* that are attached to the fuselage 12. The aircraft 10 further comprises engines 16 that are attached to the wings 14*a*, 14*b*.

The aircraft 10 has a plurality of said high-lift devices 18, such as slats 20 and flaps 22 which are examples of the control surfaces 102. The high-lift devices 18 are driven by a power control unit or PCU 24 which is an example of the control surface drive device 106. The PCU 24 outputs torque to the transmission device 108 which includes drive shafts 25 that are connected to the high-lift devices 18 in a manner known per se. In order to arrest the high-lift devices 18 in a predetermined position, wing tip brakes (WTB) 26*a*, 26*b* (elements of the brake device 118) are arranged near the end portions of the drive shafts 25.

In more detail, the high-lift system 114 includes, as flight control surface driving apparatuses 104, a slat driving apparatus 104*s* for driving the slats 20 and a flap driving apparatus 104*f* for driving the flaps. Each of these driving apparatuses 104*s*, 104*f* has a centralized PCU 24 mounted in the fuselage. Each PCU 24 is controlled by the control device 112 which includes a first and a second slat flap computer (SFCC) 32-1, 32-2. The first and second slat flap computers 32-1, 32-2 are independent from each other and control and monitor the slat and flap driving apparatuses 104*s*, 104*f* in correspondence with the pilot's operation of an input device 34.

The configurations of the slat and flap driving apparatuses 104*s*, 104*f* are similar and are explained in more detail with reference to the example of the slat driving apparatus 104*s* depicted schematically in FIG. 2.

Figure 2:
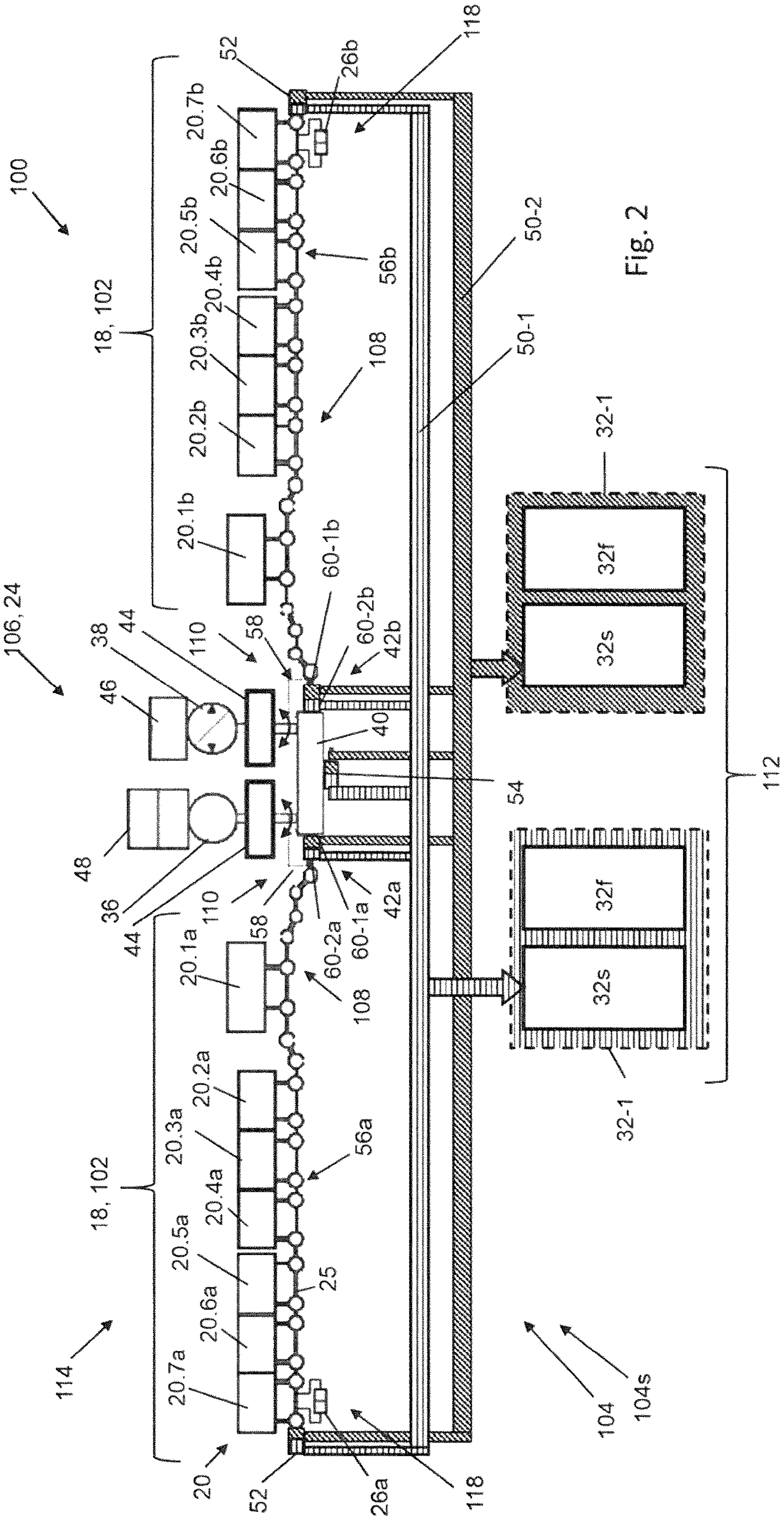
FIG. 2 depicts an embodiment of a part of a flight control system of the aircraft.

Referring now to FIG. 2, first the PCU 24 as an example of the control surface drive device 106 for generating mechanical power for the movement of the slats 20 is described. The PCU 24 has at least two independent motors 36, 38 which are connected by an appropriate gear, for example a speed summing differential gear (DIFG) 40.

The DIFG 40 has a left-hand output shaft 42*a* for driving first to seventh left-hand slats 20.1*a* to 20.7*b* and a right-hand output shaft 42*b* for driving first to seventh right-hand slats 20.1*b* to 20.7*b*.

Each motor 36, 38 is provided with a Power Off Brake 44 to arrest the motor 36, 38 in the commanded position. Depending on the aircraft power supply system and the availability requirements the PCU 24 is either purely hydraulically or electrically driven or includes an electric motor 36 and a hydraulic motor 38 (hybrid PCU) as shown in the present embodiment. For the electric motor 36, a digitally controlled brushless DC motor may be used and for the hydraulic motor 38 a digitally controlled variable displacement motor may be used and may be controlled by a hydraulic valve block 46. For the electric drive embodying the electric motor 36, a Motor Control Electronic (MCE) 48 is interfacing with the SFCC 32-1, 32-2 and an aircraft electrical busbar 50-1, 50-2. The MCE 48 converts the electric power as required for the brushless DC motor. A motor control for the hydraulic and electric drive is established by a closed loop layout to maintain speed and torque command inputs. The control algorithms are implemented, e.g. by software as computer programs, in the control device 112 (e.g. in each SFCC 32-1, 32-2) which is provided with all required data to control the motors 36, 38. The SFCCs 32-1, 32-2 of the control device 112 control this operation of the flight control surface driving apparatus 104 also in response to output signals of load sensors 110 and position pick-up units 52, 54. The SFCC 32 has a slat control portion 32*s* controlling the operation of the slat driving apparatus 104*s*, and a flap control portion 32*f* controlling the operation of the flap driving apparatus 104*f* which is not shown in FIG. 2.

The transmission device 108 includes a left-hand torque shaft system 56*a* connected to the left-hand output shaft 42*a* and a right-hand torque shaft system 56*b* connected to the right-hand output shaft 42*b*. Each torque shaft system 56*a*, 56*b* comprise a series of the drive shafts 25, connected to each other for a common rotation. A left-hand WTB 26*a* acts on the last drive shaft 25 of the left-hand torque shaft system 56*a* near the wing tip of the left-hand wing 14*a*, and a right-hand WTB 26*b* acts on the last drive shaft 25 of the right-hand torque system 56*b* near the wing tip of the right-hand wing 14*b*. Further, a position pick-up unit 52 picks up the position (e.g. an absolute rotation angle position) of the corresponding last drive shaft 25.

The load in the transmission of each wing 14*a*, 14*b* is limited by electronic load limiter functionality using the at least one load sensor 110. In the embodiment shown, where the mechanical power is transmitted via rotation, the torque in the transmission of each wing 14 is limited by electronic torque limiter functionality. The torque in the torque shaft systems 56*a*, 56*b* of the transmission device 108 is limited by electronic torque sensing units (TSU) 58 including a first torque sensor 60-1*a*, 60-1*b* and a second torque sensor 60-2*a*, 60-2*b* sensing the torque imposed on the corresponding output shaft 42*a*, 42*b* of the POB 24. For example, the TSUs 58 are integrated on the PCU outputs to the left-hand and right-hand wing 14*a*, 14*b*. The left-hand and right-hand first torque sensors 60-1*a*, 60-1*b* are connected to the first SFCC 32-1, and the left-hand and right-hand second torque sensors 60-2*a*, 60-2*b* are connected to the second SFCC 32-2.

If the TSU 58 detects that the torque in one of the PCU output shafts 42*a*, 42*b* exceeds a predetermined over torque threshold, the electrical output signal provided by the TSU 58 triggers a monitor (implemented as computer program in the control device 112) which initiates a rapid speed reversal and torque control sequence subsequently controlling the torque to a lower level. This ensures that the prescribed loads in the transmission device 108 are not exceeded even in case of a jam. Finally, the slat driving apparatus 104*s* is arrested by engaging the POB 44 of the corresponding motor 36, 38.

In the default High Lift operating mode the WTBs 26*a*, 26*b* are released and the PCU 24 is providing the power to operate the high-lift system 114 with the commanded speed into any gated position.

For implementing the load sensor 110, any appropriate load sensing principle is possible. For example, the TSU 58 which replaces mechanical system torque limiters of conventional flight control surface driving apparatuses comprises appropriate mechanical and electrical components to measure the PCU output torque and to translate it into an electrical output signal (e.g. by Linear Variable Transducer (LVDT)).

Figure 3:
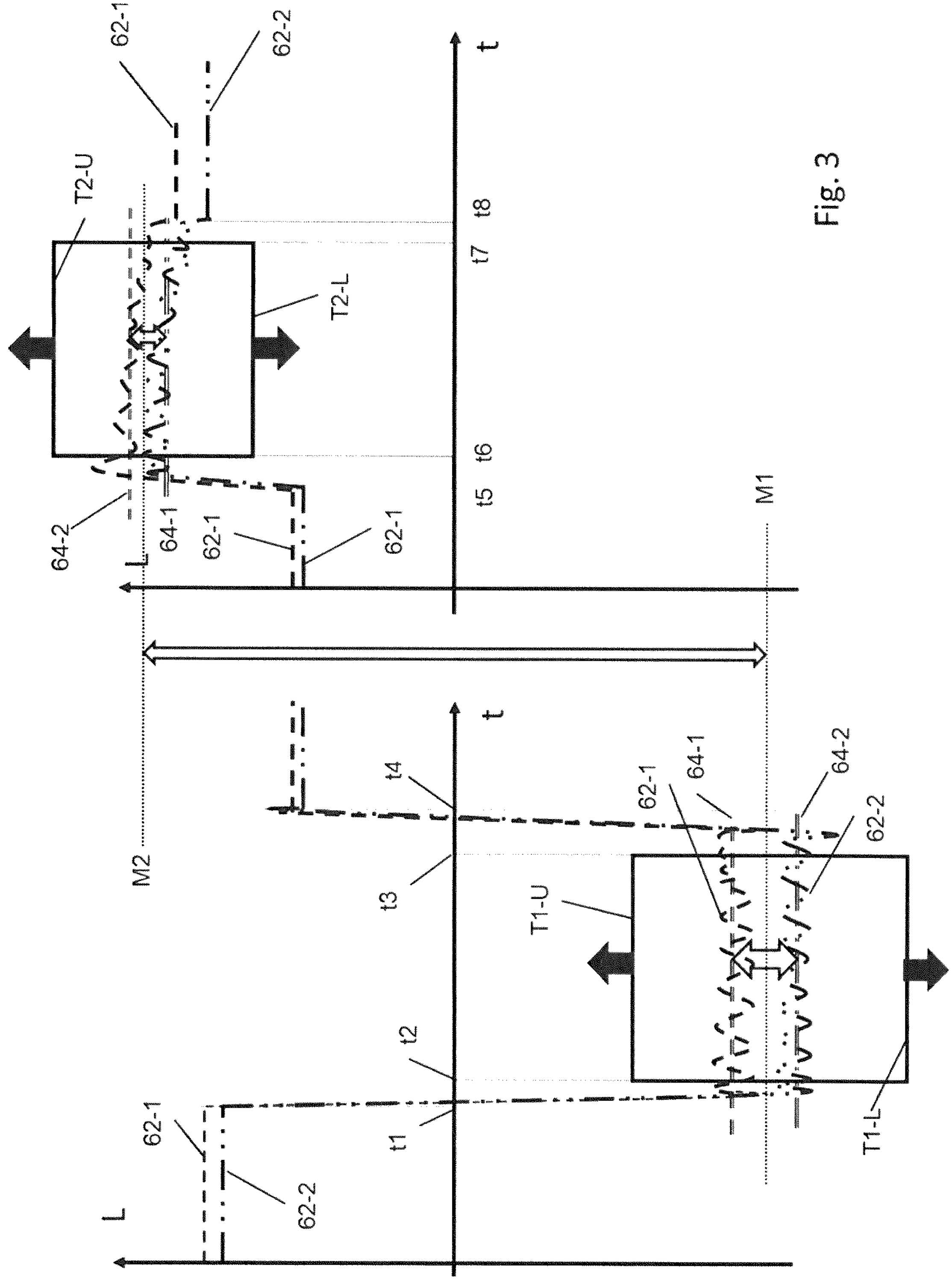
FIG. 3 shows a graph with output signals of load sensors of the flight control system during a health monitoring procedure.

In the following a health monitoring procedure for checking proper functionality of the transmission device 108 and of the load sensors 110 is described with reference to FIG. 3. The control device 112 contains a corresponding computer program and is configured to command an automatic performance of this functionality check. The functionality check leads to early detection of wear or other possible reasons for beginning deteriorations, improves long-term reliability and helps to avoid unnecessary maintenance work.

Mechanical alterations in the TSU 58 (e.g. wear or other alterations of mechanical components which transfer a torsional deflection of the output shaft 42*a*, 42*b* into a linear motion sensed by electrical sensors) will have influence on the TSU torque value readings. When operating the system on ground, the torque on the TSU is mainly determined by the drag in the system. For a healthy system the variation of the drag torque is known under consideration of external conditions (e.g. ambient temperature) and is taken into account when defining the pass/fail criteria for the TSU condition check.

An example for a TSU condition check is explained in the following with reference to FIG. 3. FIG. 3 shows a first output signal 62-1 of a first load sensor, e.g., the first torque sensor 60-1*a*, and a second output signal 62-2 of a second load sensor, e.g., the second torque sensor 60-2*a*, over the time. In the left part of the FIG. 3, the output signals 62-1, 62-2 are shown during an extension operation of the corresponding flight control surface driving apparatus 104 for extending the corresponding control surfaces over the time, and in the right part of FIG. 3, the output signals 62-1, 62-2 are shown during a retraction operation of the corresponding flight control surface driving apparatus 104 for extending the corresponding control surfaces 102 over the time. In the concrete example shown, the output signals 62-1, 62-2 are the outputs of the first and second torque sensor 60-1*a*, 60-2*a* sensing the torque on the left-hand output shaft 42*a* for driving the left-hand slats 20.1*a*-20.7*a* of FIG. 2. These outputs correspond to torque values measured in Nm.

While operating (extending or retracting) the high-lift system 114 on ground into the commanded gated position before departure and/or after landing, the TSU sensor readings are automatically evaluated for correctness. FIG. 3 shows an example for a TSU functionality check which is ideally conducted at each flight.

Ideally the evaluation of TSU signals is performed on ground after flight to avoid potential NO GO dispatch message just before take-off.

As soon as nominal operating speed is reached, the control device 112 records the left-hand and right-hand TSU torque values from both channels. The control device 112 evaluates the data by an implemented algorithm (e.g. averaging of readings, deviation between first output signal 62-1 and second output signal 62-2 etc.) and evaluates the data using implemented pass/fail criteria. Possible pass/fail criteria for the health monitoring check are for example:

- readings are within a defined range-lower threshold T1-L, T2-L<torque value L<upper threshold T1-U, T2-U.
- after landing, the difference between the post landing values (retraction) and the stored pre take-off values (extension) are evaluated. The test is passed when the difference is greater than a set minimum.

The recorded data can also be used for a health monitoring by evaluating the tendency (degradation towards defined limits).

One possible embodiment of the health monitoring method is now described in more detail with reference to FIG. 3.

The control device 112 contains a first check routine to automatically check proper functionality of the load sensors 110 and the transmission device 108 in an on-ground condition conducting the step:

a) comparing at least one load sensor output signal L of the at least one load sensor 110 with at least one first threshold T1-L, T1-U while operating the control surface drive device 106 to move the at least one control surface 102 to a predetermined extended position. An example for conducting step a) is shown in the left part of FIG. 3.

Further, the control device 112 contains a second check routine to automatically check proper functionality of the load sensors 110 and the transmission device 108 in an on-ground condition conducting the step:

b) comparing at least one load sensor output signal L of the at least one load sensor 110 with at least one second threshold T2-L, T2-U while operating the control surface drive device 106 to move the at least one control surface 102 from an extended position to a retracted position. An example for conducting step a) is shown in the right part of FIG. 3.

First Check Routine:

For example, the control device 112 contains the first check routine which may be automatically started (every time) during ground operation when preparing of a departure. First, the control device 112 determines on basis of the output of an air speed sensor (not shown) whether an on-ground condition exists where the air pressure on the control surfaces is so low that the load on the control surface drive device 106 mainly comes from the drag in the transmission device 108, and influences by air pressure can be neglected.

Further, an environmental parameter such as a temperature, an air pressure, humidity and so on can be detected in order to compensate effects thereof. The effects of environmental parameters to the output signals 62-1, 62-2 can be determined on basis of easy tests. As an alternative or as an additional measure, thresholds for the functionality tests may be set in dependence from the at least one environmental parameter.

At the time t1, the control device 112 commands the control surface drive device 106 to drive the control surfaces 102, e.g., the left-hand slats 20.1*a* to 20.7*a*, to an extended position. The operation speed is monitored, and the measurement is started at time t2, where the operation speed for extending the slats 20.1*a*-20.7*a* is determined to be in the gated speed range. As may be seen in FIG. 3, the output signals 62-1, 62-2 may contain variations caused by vibrations in the torque sensor 60-1, 60-2 or in the torque shaft system 56*a*, or the like. The measurement ends on time t3, and a first mathematical average value 64-1, 64-2 is calculated for each of the first and second output signals 62-1, 62-2 from all values obtained during the time interval [t2, t3]. At time t4, the fully extended position is achieved. Time t3 is chosen to lie before time t4 such that effects of end stops or the like will not be taken into account.

The control device 112 determines whether each of the first mathematical average values 64-1, 64-2 for the first and second output signals 62-1, 62-2 lies within the range between a first lower threshold T1-L and a first upper threshold T1-U. If not, the functionality check is failed.

Further, the control device calculates a difference between the mathematical average values 64-1, 64-2 for the first output signal 62-1 and the second output signal 62-2 and determines whether the amount thereof exceeds a predetermined third threshold. If so, the functionality check is failed.

Further, the control device 112 calculates a mathematical mean average M1 of first mathematical average values 64-1, 64-2 and stores this mathematical mean average M1 for later use.

Alternatively or additionally to checking whether the first mathematical average values 64-1, 64-2 of both the first and second output signals 62-1, 62-2 are within the range between the first lower and upper thresholds T1-L, T1-U, the control device 112 can evaluate whether the mathematical mean average M1 calculated from both output signals 62-1, 62-2 lies in the range between the first lower threshold T1-L and the first upper threshold T1-U.

In a preferred embodiment, the first check routine may also comprise a comparison of the newly achieved first mathematical mean average M1 with previously stored mean averages M1, M2. For example, the control device 112 compares this first mathematical mean average M1 with a second mathematical mean average M2 calculated and stored before when doing the functionality check during a previous retracting operation. The check may comprise determining whether an amount of a difference between the first mathematical mean average M1 and a previously stored second mathematical mean average exceeds a predetermined minimum value.

When all of the checks are okay, the functionality check of the first check routine is passed.

Second Check Routine:

For example, the control device 112 contains the second check routine and is configured to start the second check routine (every time) automatically after landing. First, the control device 112 determines on basis of the output of an air speed sensor (not shown) whether an on-ground condition exists where the air pressure on the control surfaces is low so that the load on the control surface drive device 106 mainly comes from the drag in the transmission device 108, and influences by air pressure can be neglected. Such on-ground condition may exist, for example, shortly after landing during taxi. The high-lift system 118 may still be in an extended position which was active during landing, and the test may be performed during the following retraction operation.

Again, the control device can obtain a signal indicative of an environmental parameter such as a temperature, an air pressure, humidity and so on in order to compensate effects thereof and/or adjust the thresholds.

At the time t5, the control device 112 commands the control surface drive device 106 to retract the control surfaces 102, e.g., the left-hand slats 20.1*a* to 20.7*a*, from an extended position to a retracted position. The operation speed is monitored, and the measurement is started at time t6, where the operation speed is determined to be in the gated speed range. Again, as explained above, the output signals 62-1, 62-2 may contain variations caused by vibrations in the torque sensor 60-1, 60-2 or in the torque shaft system 56*a* or the like. The measurement ends on time t7, and a second mathematical average value 66-1, 66-2 is calculated for each output signal 62-1, 62-2 from all values obtained during the test time interval [t6, t7]. Time t7 is determined to lie before time t8 when the fully retracted position is achieved. Hence, end stops or the like will not have an effect in the load measurement during the functionality check.

The control device 112 determines whether each of the second mathematical average values 66-1, 66-2 for the first and second output signals 62-1, 62-2 lies within the range between a second lower threshold T2-L and a second upper threshold T2-U. If not, the functionality check is failed.

Further, the control device 112 calculates a second difference between the second mathematical average values 66-1, 66-2 for the first output signal 62-1 and the second output signal 62-2 and determines whether the amount of the second difference exceeds predetermined fourth threshold. If so, the functionality check is failed.

Further, the control device calculates a second mathematical mean average M2 of the second mathematical average values 66-1, 66-2 and compares this second mathematical mean average M2 with the first mathematical mean average M1 stored before when doing the functionality check during the extending operation.

Alternatively or additionally to checking whether the second mathematical average values 66-1, 66-2 of both the first and second output signals 62-1, 62-2 are within the range between the second lower and upper thresholds T2-L, T2-U, the control device 112 can evaluate whether the second mathematical mean average M2 calculated from both output signals 62-1, 62-2 lies in the range between the second lower threshold T2-L and the second upper threshold T2-U.

Further, in case that an amount of a difference between the mathematical mean averages M1 and M2 is lower than a minimum difference threshold, the functionality check is failed.

In all other cases, the functionality check of the second check routine is passed.

According to one embodiment, the control device 112 is configured to conduct the first check routine indicated above again after arriving a parking station and, hence, well before a further departure.

Although the health monitoring method has been explained on basis of a slat driving apparatus 104*s* for driving several slats 20.1*a*-20.7*a*, and with concrete thresholds for torques as loads measured therein, it is clear that similar functionality tests may be made for other flight control surface driving apparatuses 104, using different load sensors 110.

Hence, methods, apparatuses, systems and an aircraft have been described which enable an automatically performed load (especially torque) sensor monitoring during ground operation.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS LIST

10 aircraft
12 fuselage
14*a* left-hand wing
14*b* right-hand wing
16 engine
18 high-lift device
20 slat
20.1*a*-20.7*a* left-hand slats
20.1*b*-20.7*b* right-hand slats
22 flap
24 PCU
25 drive shaft
26*a* left-hand WTB
26*b* right-hand WTB
32-1 first SFCC
32-2 second SFCC
32*s* slat control portion
32*f* flap control portion
34 input device
36 electric motor
38 hydraulic motor
40 DIFG
42*a* left-hand output shaft
42*b* right-hand output shaft
44 POB
46 hydraulic valve block
48 MCE
50-1 electric busbar
50-2 electric busbar
52 position pick-up unit (output of transmission device)
54 position pick-up unit (DIFG)
56*a* left-hand torque shaft system
56*b* right-hand torque shaft system
58 TSU
60-1*a* left-hand first torque sensor (example for first load sensor)
60-1*b* left-hand first torque sensor (example for first load sensor)
60-2*a* left-hand second torque sensor (example for second load sensor)
60-2*b* left-hand second torque sensor (example for second load sensor)
62-1 first output signal
62-2 second output signal

64-1 first mathematical average value of the first output signal over test time interval during extension operation
64-2 first mathematical average value of the second output signal over test time interval during extension operation
66-1 second mathematical average value of the first output signal over test time interval during retraction operation
66-2 second mathematical average value of the second output signal over test time interval during retraction operation
100 flight control system
102 control surface
104 flight control surface driving apparatus
104*s* slat driving apparatus
104*f* flap driving apparatus
106 control surface drive device
108 transmission device
110 load sensor
112 control device
114 high-lift system
118 brake device
M1 first mathematical mean average
M2 second mathematical mean average
L load, for example torque [Nm]
t time
T1-L first lower threshold
T1-U first upper threshold
T2-L second lower threshold
T2-U second upper threshold
t1 start of extension operation
t2 extracting operation speed achieves gated range-begin of measurement of first functionality check routine
t3 end of measurement for first functionality check routine
t4 arriving extended position
t5 start of retracting operation
t6 retracting operation speed achieves gated range-begin of measurement of second functionality check routine
t7 end of measurement for second functionality check routine
t8 arriving fully retracted position

The invention claimed is:

1. A method for checking a functionality of a flight control surface driving apparatus comprising a control surface drive device for generating mechanical power for moving at least one control surface, a transmission device for transmitting mechanical power from the control surface drive device to the at least one control surface, at least one load sensor for sensing a load imposed on the control surface drive device, and a control device configured to receive a load sensor output signal from the at least one load sensor and to control the control surface drive device in response to the load sensor output signal, wherein the method comprises:

automatically checking proper functionality of the at least one load sensor and the transmission device in at least one on-ground condition by at least one of:

a) comparing at least one load sensor output signal of the at least one load sensor with at least one first threshold while operating the control surface drive device to move the at least one control surface to a predetermined extended position, or b) comparing at least one load sensor output signal of the at least one load sensor with at least one second threshold while operating the control surface drive device to move the at least one control surface from an extended position to a retracted position, or both a) and b);

obtaining at least one environmental parameter influencing the at least one load sensor output signal and compensating the load sensor output signal in response to the at least one environmental parameter, or adjusting at least one of the thresholds in dependence from the at least one environmental parameter, or both.

2. The method according to claim 1, wherein step a) comprises at least one or several of:

a1) performing the comparison and the operation of the control surface drive device to extract the at least one control surface every time before take-off;

a2) performing the comparison and the operation of the control surface drive device to extract the at least one control surface during taxi or when arriving a parking position every time after landing;

a3) evaluating whether the at least one load sensor output signal lies between a first lower and a first upper threshold;

a4) obtaining an average value of load sensor output signals of the at least one load sensor over a time interval during an extracting operation and comparing the average value with the at least one first threshold;

a5) obtaining a first load sensor output signal from a first load sensor for sensing a load imposed on the control surface drive device and a second load sensor output signal from a second load sensor for sensing a load imposed on the control surface drive device and comparing the first and the second load sensor output signals with the at least one first threshold, a6) obtaining a first load sensor output signal from a first load sensor for sensing a load imposed on the control surface drive device and a second load sensor output signal from a second load sensor for sensing a load imposed on the control surface drive device, obtaining an average from the first and second load sensor output signals and comparing this average with the at least one first threshold, a7) obtaining a first load sensor output signal from a first load sensor for sensing a load imposed on the control surface drive device and a second load sensor output signal from a second load sensor for sensing a load imposed on the control surface drive device while operating the control surface drive device to extract the at least one control surface and comparing a difference between the first and second load sensor output signals with at least one third threshold, and, a8) determining an operation speed for extracting the at least one control surface and performing the comparison when the operation speed lies in a predetermined nominal operation speed range.

3. The method according to claim 1, wherein step b) comprises at least one or several of:

b1) performing the comparing and the operating of the control surface drive device to retract the at least one control surface every time after landing;

b2) performing the comparing and the operating of the control surface drive device to retract the at least one control surface during taxi or on arrival of a parking position every time after landing, b3) evaluating whether the at least one load sensor output signal lies between a second lower and a second upper threshold;

b4) obtaining an average value) of load sensor output signals of the at least one load sensor over a time interval during a retracting operation and comparing the average value with the at least one second threshold;

b5) obtaining a first load sensor output signal from a first load sensor for sensing a load imposed on the control surface drive device and a second load sensor output signal from a second load sensor for sensing a load imposed on the control surface drive device and comparing the first and the second load sensor output signals with the at least one second threshold, b6) obtaining a first load sensor output signal from a first load sensor for sensing a load imposed on the control surface drive device and a second load sensor output signal from a second load sensor for sensing a load imposed on the control surface drive device, obtaining an average from the first and second load sensor output signals and comparing this average with the at least one second threshold, b7) obtaining a first load sensor output signal from a first load sensor for sensing a load imposed on the control surface drive device and a second load sensor output signal from a second load sensor for sensing a load imposed on the control surface drive device while operating the control surface drive device to retract the at least one control surface and comparing a difference between the first and second load sensor output signals with at least one third threshold, and, b8) determining an operation speed for retracting the at least one control surface and performing the comparison when the operation speed lies in a predetermined nominal operation speed range.

4. The method according to claim 1, comprising both steps a) and b), one after another, and further comprising:

c) determining whether an amount of a difference between at least one load sensor output signal of the at least one load sensor obtained in step a) during an extracting operation and at least one load sensor output signal (M2) of the at least one load sensor obtained in step b) during a retracting operation exceeds a predetermined minimum.

5. The method according to claim 1, further comprising: determining whether the at least one on-ground condition exists on basis of a relative air speed.

6. The method according to claim 1, wherein the flight control surface driving apparatus to be monitored comprises at least one rotating element for transmitting mechanical power to the at least one control surface, wherein the at least one load sensor is at least one torque sensor for determining a torque on the rotating element.

7. An apparatus for driving a flight control surface, the apparatus comprising:

a control surface drive device for generating mechanical power for moving at least one control surface, a transmission device for transmitting mechanical power from the control surface drive device to the at least one control surface, at least one load sensor for sensing a load imposed on the control surface drive device, a control device configured to receive a load sensor output signal from the at least one load sensor and to control the control surface drive device in response to the load sensor output signal, the control device being configured to:

automatically check proper functionality of the at least one load sensor and the transmission device in at least one on-ground condition by at least one of a) comparing at least one load sensor output signal of the at least one load sensor with at least one first threshold while operating the control surface drive device to move the at least one control surface to a predetermined extended position, or b) comparing at least one load sensor output signal of the at least one load sensor with at least one second threshold while operating the control surface drive device to move the at least one control surface from an extended position to a retracted position, or both a) and b), and, an environmental parameter sensor for sensing at least one environmental parameter affecting the at least one load sensor output signal, wherein the control device is further configured to compensate the effect on the at least one load sensor output signal in response to an output of the at least one environmental parameter sensor.

8. The apparatus of claim 7, wherein the control surface drive device comprises at least one rotating output shaft, and the at least one load sensor comprises at least one torque sensor for sensing a torque of the rotating output shaft.

9. A flight control system for an aircraft comprising:

at least one flight control surface and the apparatus according to claim 7 configured to drive a movement of the at least one flight control surface.

10. The flight control system according to claim 9, wherein the at least one control surface comprises a high-lift device.

11. The flight control system according to claim 9, further comprising at least one of the following:

an air speed sensing device for determining a relative air-speed wherein the control device is configured to conduct the check of proper functionality in response to an output of the air speed sensing device, a first load sensor for sensing the load imposed on the control surface drive device and a first controller receiving a load sensor output signal of the first load sensor and controlling a movement of the at least one control surface in response to the load sensor output signal of the first load sensor, a second load sensor for sensing the load imposed on the control surface drive device and a second controller receiving a load sensor output signal of the second load sensor and controlling a movement of the at least one control surface in response to the load sensor output signal of the second load sensor, at least one brake device for braking or blocking movement of the transmission device, and, any combination thereof.

12. The flight control system according to claim 9, wherein the control device is configured to compare the load sensor output signal of the at least one load sensor with a predetermined maximum load value in a flight condition and to trigger, when the load sensor output exceeds the predetermined maximum load value, a reverse movement and a subsequent load control sequence for controlling the load to achieve a lower load level.

13. An aircraft comprising:

the flight control system according to claim 9.

14. A non-transitory computer readable media storing a computer program comprising instructions to cause a flight control system to execute the method of claim 1 when the method includes step a).

15. A non-transitory computer readable media storing a computer program comprising instructions to cause a flight control system to execute the method of claim 1 when the method includes step b).

* * * * *